May 28, 1935. A. H. NEULAND 2,002,828
GEAR DAMPER FOR ENGINE DRIVE TRANSMISSION SYSTEMS
Filed Dec. 30, 1932 2 Sheets-Sheet 1
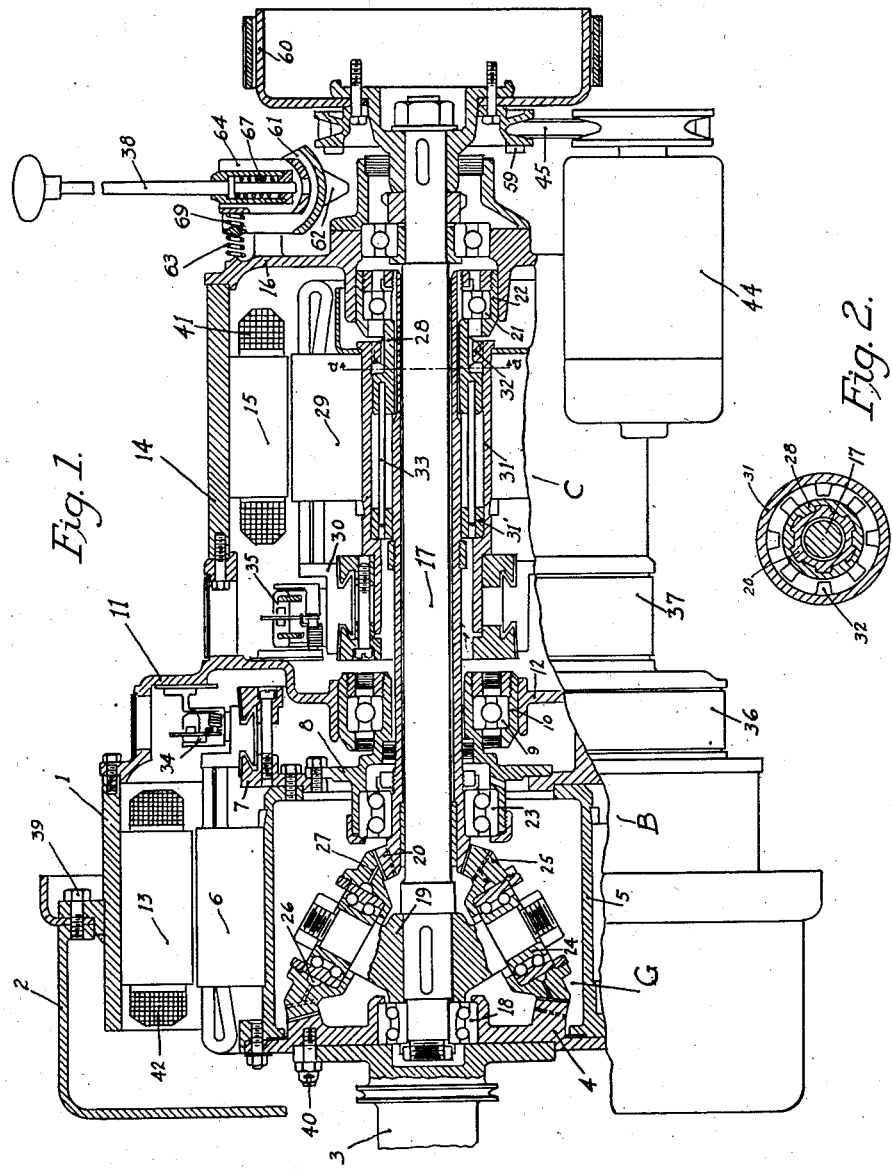
INVENTOR
ALFONS H. NEULAND
BY Ralph B. Stewart
ATTORNEY May 28, 1935.  A. H. NEULAND  2,002,828
GEAR DAMPER FOR ENGINE DRIVE TRANSMISSION SYSTEMS
Filed Dec. 30, 1932  2 Sheets-Sheet 2
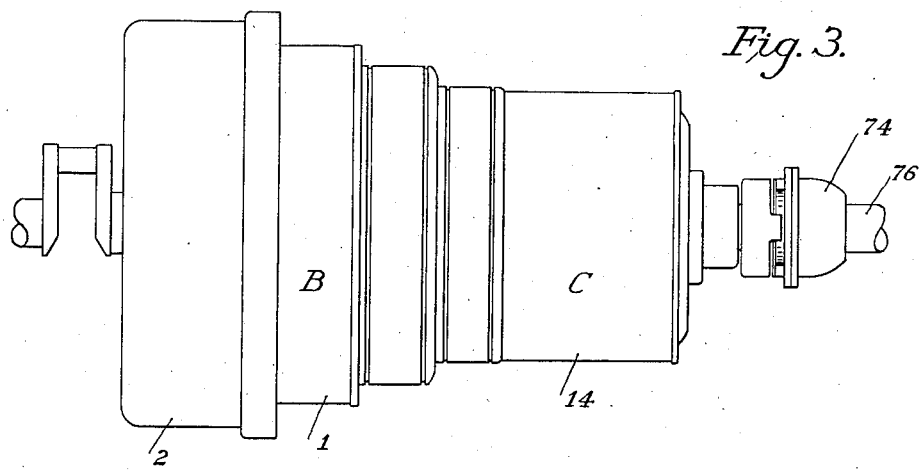
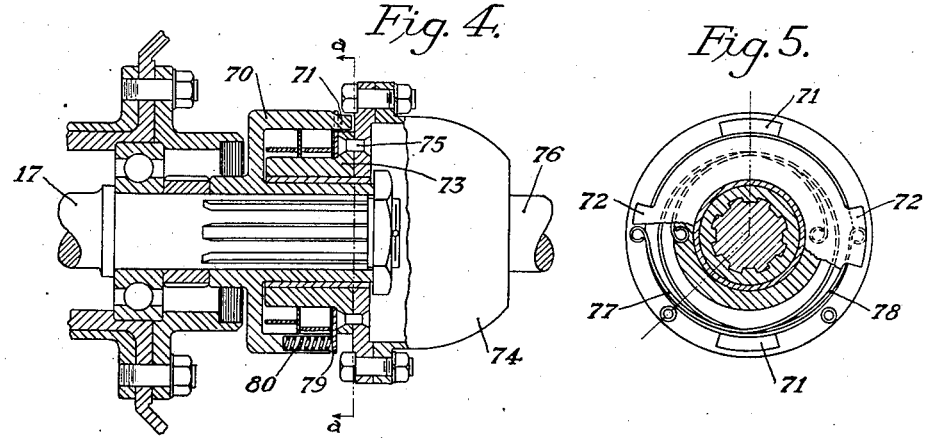 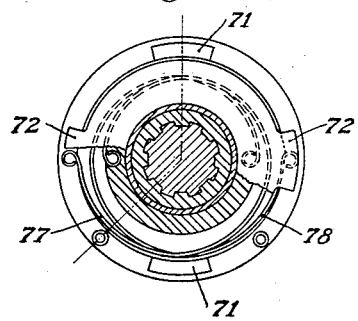
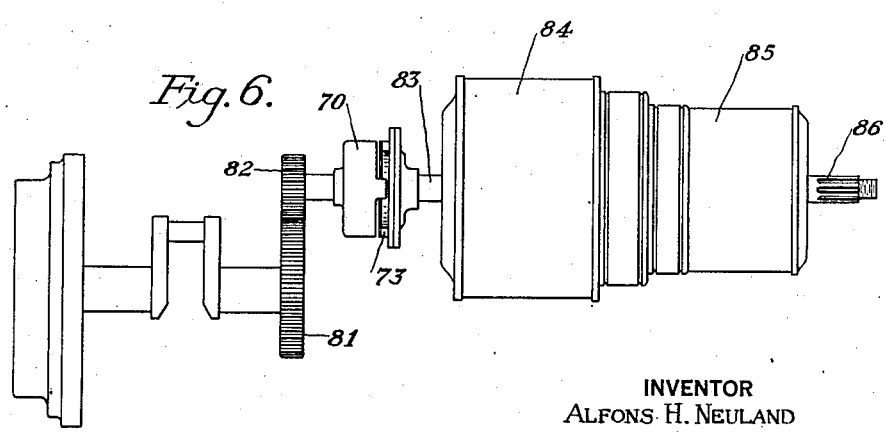
INVENTOR
ALFONS H. NEULAND
BY Ralph B. Stewart
ATTORNEY Patented May 28, 1935

2,002,828

UNITED STATES PATENT OFFICE 2,002,828

GEAR DAMPER FOR ENGINE DRIVE TRANSMISSION SYSTEMS

Alfons H. Neuland, Irvington, N. J.

Application December 30, 1932, Serial No. 649,637

20 Claims. (Cl. 74—282)

This application is in part a continuation of my copending application for Electric system and control for motor vehicles and other purposes, Serial No. 508,094, filed January 12, 1931.

One object of my invention is to interpose a damper between the engine and the load to prevent chattering in the gearing and to prevent the vibration of the transmission from reaching the chassis of the vehicle, particularly when the engine idles and the vehicle is not in motion.

Other objects and advantages of my invention will appear from the following detailed description and appended drawings of preferred embodiments of my invention which I have selected for illustration.

Fig. 1 is in part a longitudinal section and in part a side elevation of the transmission, showing its detailed construction and method of combining with an engine to form a unit power plant.

Fig. 2 is a section thru the mechanical clutch showing particularly the spaces between the teeth on the inner and outer members taken on the line a—a of Fig. 1.

Fig. 3 is another species of my invention in which the damper is mounted outside of the transmission and interposed between the transmission and the load.

Fig. 4 is in part a longitudinal section thru the damper shown in Fig. 3.

Fig. 5 is in part a transverse section of the damper taken on the line a—a of Fig. 4.

Fig. 6 is another species of the invention having the damper interposed between the engine and the transmission system.

Referring to the figures, in which like numerals identify like elements, the transmission consists of a dynamo B, which will hereafter also be referred to as the booster, a second dynamo or clutch C and a differential gear train G. The booster field ring 1 is bolted to the bell housing 2 of an engine or power source having a shaft 3. A gear 4, which will hereafter be referred to as the engine gear or power gear, is bolted to the shaft 3. I further provide a rotor or armature 6 assembled on a drum 5 having one of its ends bolted to a flange on the gear 4, while the other end of the drum has a commutator 7 and a bearing carrier 8 bolted to it. A ball bearing 9 has its inner race locked on an extension of the carrier and its outer race disposed within the barrel 10. An intermediate bracket 11, bolted to the field ring 1 is provided, having a cylindrical portion 12 bored out to receive the barrel 10 for the purpose of aligning and rigidly supporting the rotor 6 with respect to the field poles 13. The bracket 11 also serves to carry the clutch field ring 14 having the pole pieces 15 bolted to it. A rear bracket 16 is also bolted to the field ring 14. I provide a propeller or load shaft 17 extending thru the length of the transmission and having one of its ends journaled in the bracket 16 and having its other end locked within the inner end of a combined radial and thrust bearing 18 carried by and aligned with the gear case and the engine shaft 3. I also provide a gear 20 having a hollow extension or sleeve preferably arranged to form an integral part of the gear which surrounds the shaft 17 and which will hereafter also be referred to as the clutch gear or balancing gear. One end of the sleeve is supported by the bearing 21 disposed within the barrel 22 carried by the bracket 16, and the other end of the sleeve is supported by the combined radial and thrust bearing 23 locked within the carrier 8. A spider or gear carrier 19 is keyed to the shaft 17 and has combination thrust and radial bearings 24 secured to it for carrying the intermediate or load gears 25 preferably two in number arranged to mesh directly with the engine and sleeve gears. The intermediate gears will hereafter also be referred to as propeller gears and are provided with a groove or reservoir 26 and holes 27 connecting the reservoir with the spaces between the gear teeth. By these means the lubricant, which due to centrifugal force during engine rotation hugs the inner wall of the drum 5, is pumped into the holes and the reservoir and due to centrifugal force acting on the rotating gear 25, is expelled against the teeth of the sleeve gear 20, thereby keeping it lubricated.

The clutch armature or rotor 29 and its commutator 30 are carried by the sleeve of the gear 20. The commutators 7 and 30 are arranged adjacent to each other and are provided with brushes 34—35 secured to the bracket 11. The arrangement of the brush bracket intermediate between the booster and clutch units provides accessibility for inspection and replacement of brushes which may be reached by removing the cover bands 36, 37 through openings in the bracket. This construction also permits the bolting of the front of the transmission securely to the engine block, it leaves the rear of the transmission free for the mounting of control devices such as the regulating generator 44 or control lever 38 operating a locking mechanism 59, 61 and 62 and a control switch not shown, and results in an assembly that is self-contained and of unitary construction for attachment to the engine to form a unit power plant, removal of bolts 39 and 40 sufficing to remove the transmission from the engine as a unit.

When the engine is in operation and the vehicle is at rest the rotor 29 is driven through the differential gearing in reverse direction with respect to engine rotation. The rotor 29 and its commutator 30 have considerable inertia and tend to rotate at a uniform angle velocity while the explosions in the engine cylinders drive the engine shaft at a non-uniform angular velocity. This difference between the angular velocities of engine and armature causes surging and reversal of power or hunting in the gearing when the engine idles and the car is at rest, the engine shaft driving the armature one instant and making contact on one side of the gear teeth and the inertia in the armature driving the engine shaft the next instant and making contact on the other side of the gear teeth. This ordinarily results in vibration and chattering between the gear teeth which may be transmitted to the propeller shaft and the vehicle when the car is at rest.

In order to dampen gear noise during the period when the engine idles without transmitting power to the vehicle wheels I provide a damper to cushion the impact between the gear teeth due to differences in angular velocity between the engine shaft and the mass of the armature 29 which may be interposed at any suitable point between the propeller or engine shaft and the mass of the armature 29.

The damper may, for example, take the form illustrated in Figures 1 and 2 in which I provide a sleeve 28 securely splined to the sleeve of the gear 20 to rotate therewith. The clutch armature 29 is assembled on a sleeve 31 which at one point rests on the sleeve 28 and at another point has a collar 31' securely attached to it and rotatably mounted on the sleeve of the gear 20. The sleeves 28 and 31 are provided with loosely fitted clutch teeth 32 so as to permit a certain amount of angular movement between the sleeves before the clutch teeth on one sleeve contact with the clutch teeth on the other sleeve. I also provide yielding members or springs 33 which may conveniently take the form of round spring rods having one of their ends inserted in holes drilled in the collar of the sleeve 31 and their other ends inserted in holes of the sleeve 28. The spring rods are aligned with respect to the loosely fitted clutch teeth 32 on the sleeves 28 and 31 so that angular movement of the sleeve of the gear 20 with respect to the armature 29 will flex the spring rods 33 in one or the other direction before the clutch teeth 32 make contact with one another and establish a positive drive. This action of the springs cushions the impact between the teeth of the gears 4, 25 and 20, smoothens out the difference in angular velocity between clutch armature and engine shaft and thereby dampens gear noise whenever the engine idles and the vehicle is at rest.

This part of my invention is taken from my copending application Serial No. 508,094, filed January 12, 1931. My said prior application contains a full disclosure of other details of the system and its operation.

Figs. 4 and 5 illustrate a form of damper suitable for use in connection with the embodiment of my invention shown in Fig. 3. It consists of a cup 70 splined to the shaft 17 provided with clutch teeth 71, 71 adapted to engage with the clutch teeth 72, 72 on the sleeve 73, the sleeve being loosely journaled within the cup 70 and having its flanged portion secured to the universal joint 74 by some means such as the rivets 75. This construction permits considerable angular movement of the shaft 17 with respect to the propeller shaft 76 and permits a substantial variation in the angular velocity of the engine shaft with respect to the propeller shaft before the clutch teeth 71 and 72 come in contact with one another. I further provide a yielding connection between the elements 70 and 73 which serves to hold the clutch teeth 72 intermediate between the clutch teeth 71 when transfer of torque between the shafts ceases. Rubber may be employed to provide the yielding connection which may take the form of a rubber bushing having its outer surface secured to the cup 70 and its inner surface secured to the sleeve 73. In the illustrated embodiment I employ a pair of spiral springs 77 and 78 having their outer ends embedded in grooves of the cup 70 and their inner ends in grooves of the sleeve 73. When the springs are wound in opposite directions and have equal tension the clutch teeth 71 will normally assume a position mid-way between the clutch teeth 72. This type of yielding connection is double acting in that it permits relative movement of the parts 70 and 73 in one direction when the engine runs ahead of the rotor, and permits relative movement in the opposite direction when the rotor runs ahead of the engine. In some instances it may be desirable to fix the position of the clutch teeth 71 with respect to clutch teeth 72 so as to allow a greater movement in one direction than in the other, or arrange them so that the movement will be all in one direction. This is accomplished by changing the tension of one spring with respect to the other or by fastening the ends of the springs to the parts 70, 73 so as to secure the desired relative position. Where movement in only one direction is desired, a single spring may be used, so wound as to pull the clutch teeth 72—71 together on one side and so that the explosions in the cylinders will tend to separate the clutch teeth 71—72 and wind up the spring, the tension of the spring returning the clutch teeth to their former position when the rotor overruns the engine. The double acting arrangement is particularly effective in damping the hunting tendency between the engine and rotor members and in reducing gear noise while the engine idles, as it permits the cup 70 to oscillate in either direction with respect to the sleeve 73 without transferring any considerable amount of vibration to the vehicle.

It will be understood that the transmission arrangement between the engine and the damper of Fig. 3 is the same as in Fig. 1 except that the armature 29 of the clutch dynamo C is secured directly to the sleeve of gear 20. With either form of construction it will be seen that the armature 29 is driven by reaction from the load shaft and, vice versa, the load shaft is driven by reaction from the clutch dynamo.

In instances where still greater damping effectiveness is desired, I provide a friction device which operates to absorb a portion of the energy represented by the oscillations. In the illustrated embodiment this device consists of a friction plate 79, arranged between the members 70, 73 and pressed against member 73 by the springs 80. Absorption of a portion of the energy of oscillation prevents the action of the springs from increasing the amplitude of oscillation whenever the natural period of oscillation of the engine and of the damper are the same.

The damper illustrated in Figs. 4 and 5 is also suitable for use in connection with a transmission system supplied with energy from an internal combustion engine where it is desired to operate the input shaft of the transmission or a generator at a different speed from the speed of the engine by means of a gear or chain drive. With this arrangement, a gear 81 may be secured to the engine shaft 3 to mesh with a gear 82 of a different diameter. One member of the damper, for instance, the cup 70 may be secured to gear 82 and the other member 73 to the input shaft 83 of the transmission 84, 85. The transmission 84, 85 may be of the type employing differential gearing or may be of any other type. For instance, the part 84 may take the form of a generator and part 85 may take the form of a motor having no mechanical connection with the generator but receiving electrical energy from it for driving the load shaft 86.

The operation of the damper in this embodiment is similar to its operation above described, and in instances where the transmission is of a type employing gearing, the damper operates to dampen hunting in gears 81, 82 on one side of the damper and also to dampen hunting in the transmission gears interposed between the dampers and the wheels of the vehicle. It will also be understood that in Fig. 6 gears 81 and 82 may be omitted and the engine may be directly connected to the cup 70 of the damper.

While I have illustrated several arrangements of damper devices in connection with electric transmission systems, it is obvious that my invention may be used in purely mechanical systems, for example, the clutch dynamo may be omitted and its armature replaced by a friction reaction clutch or similar device connected to the gear 20, omitting also the booster dynamo, but retaining the differential gear connections.

In all forms of my invention described herein, as soon as substantial power flow is established from the driving shaft, a positive drive connection is established in parallel with the driving and driven elements of the resilient drive connection and serves to transmit the major portion of the driving torque.

While I have herein shown several species of my invention and described their operation in connection with an internal combustion engine and a motor vehicle, I desire to have it understood that my invention is adapted for other uses and that it may be used in whole or in part, depending upon the requirements to be met, in the described or other embodiments within the principle and scope of my invention, and I desire that only limitations required by the prior art or appended claims be imposed upon it.

I claim:

1. In combination, a power member rotating at a varying angular velocity, a rotor member having substantial inertia, gearing connecting said rotor member with said power member, a yielding transmission connection between one of said members and said gearing, and means operative upon a predetermined movement of said yielding connection to establish a positive drive connection between said members.

2. In combination, an internal combustion engine having a member rotating at a varying angular velocity at low speed, a dynamo rotor member having substantial inertia, a load member, differential gearing connecting all of said members, yielding means for permitting an angular movement of one of said members and additional means for limiting said angular movement and for positively transmitting power between said engine and said load member.

3. In combination, an engine having a member delivering power at a varying angular velocity, a rotor member having substantial inertia and adapted to receive power from the power member, gearing connecting said rotor member with said engine member, means including a yielding connection between one of said members and said gearing for reducing gear noise when the engine idles at low speed, and means including an unyielding drive connection between the members for transferring substantial power between the member, said yielding connection being incapable of transmitting substantial torque between said members.

4. In combination, an engine having a power member delivering power at a varying angular velocity, a rotor member having substantial inertia and adapted to receive power from the power member, gearing connecting said rotor member with said engine member, means for establishing an unyielding drive connection for the transfer of substantial power between the members and means including a yielding drive connection between the members for disconnecting said unyielding connection when power transfer between the members substantially ceases, whereby gear noise is substantially reduced.

5. In combination, an internal combustion engine having a power member delivering power at a varying angular velocity, a dynamo rotor member having substantial inertia and adapted to receive power from the power member, gearing connecting said dynamo rotor member with said power member, means for establishing a positive drive connection for the transfer of substantial power between the members and means including a yielding drive connection between the members for disconnecting the positive drive connection when power transfer between the members substantially ceases, whereby chattering of the gears is substantially reduced.

6. In combination, an internal combustion engine having a member delivering power at a varying angular velocity, a rotor member having substantial inertia and adapted to receive power from the engine member, a plurality of gears, an unyielding drive connection, means for transferring substantial power between said members including said gearing and said unyielding drive connection, a yielding drive connection between said members, friction means interposed between the members and means including said unyielding drive connection and said friction means for damping hunting in the gearing when said engine idles.

7. In combination, a power-shaft driven at varying angular velocity, a load shaft, means for transferring power from said power shaft to said load shaft including a rotor element having substantial inertia coupled to said power shaft by gearing, a yielding transmission device interposed between said power shaft and said rotor element for reducing gear noises when power transmission ceases and said rotor is driven free by said power shaft, and means operative upon a predetermined movement of said yielding transmission device to establish a positive drive connection in parallel with said yielding device.

8. In combination, a power shaft driven at varying angular velocity, a load shaft, a reaction device having substantial rotary inertia, differential gearing connecting said power shaft, load shaft and reaction device for driving said load shaft from said power shaft by reaction from said reaction device, a yielding transmission connection interposed between said reaction device and one of said shafts for reducing gear noises due to the varying angular velocity of said power shaft, and means operative upon a predetermined movement of said yielding connection to establish a positive drive connection in parallel with said yielding connection.

9. In combination, a power shaft driven at varying angular velocity, a load shaft, a reaction device having substantial rotary inertia, differential gearing connecting said power shaft, load shaft and reaction device for driving said load shaft from said power shaft by reaction from said reaction device, a yielding transmission connection interposed between said reaction device and said differential gearing for reducing gear noises when said load shaft is at rest and said reaction device is running free, and means operative upon a predetermined movement of said yielding connection to establish a positive drive connection between said reaction device and said differential gearing.

10. In combination, a power shaft driven at varying angular velocity, a load shaft, a reaction device having a substantial rotary inertia, differential gearing connecting said power shaft, load shaft and reaction device for driving said load shaft from said power shaft by reaction from said reaction device, a yielding transmission connection interposed between said power shaft and said differential gearing for reducing gear noises when said load shaft is at rest and said reaction device is running free, and means operative upon a predetermined movement of said yielding connection to establish a positive drive connection between said power shaft and said differential gearing.

11. In combination, a power shaft driven at varying angular velocity, a load shaft, a reaction device having substantial rotary inertia, differential gearing connecting said power shaft, load shaft and reaction device for driving said load shaft from said power shaft by reaction from said reaction device, a yielding transmission connection interposed between said load shaft and said differential gearing for reducing gear noises when said load shaft is at rest and said reaction device is running free, and means operative upon a predetermined movement of said yielding connection to establish a positive drive connection between said load shaft and said differential gearing.

12. In combination, a power shaft driven at varying angular velocity, a load shaft, a reaction device having substantial rotary inertia, differential gearing connecting said power shaft, load shaft and reaction device for driving said load shaft from said power shaft by reaction from said reaction device, a yielding transmission connection interposed between said reaction device and one of said shafts for reducing gear noises when said load shaft is at rest and said reaction device is running free, and means operative upon a predetermined movement of said yielding connection to establish a positive drive connection in parallel with said yielding connection.

13. In combination, an internal combustion engine having a shaft driven at varying angular velocity, a load shaft, a reaction device having substantial rotary inertia, differential gearing connecting said power shaft, load shaft and reaction device for driving said load shaft from said power shaft by reaction from said reaction device, and for driving said reaction device by reaction from the load shaft, a yielding transmission device interposed between said reaction device and one of said shafts for reducing gear noises when said load shaft is at rest and said reaction device is running free, and cooperating stops arranged on the elements of said transmission device operative upon a predetermined movement of said elements to establish a positive drive connection in parallel with said yielding device.

14. In combination, a variable speed internal combustion engine, a rotor having inertia, a load shaft, a differential gearing connecting the engine with the rotor and the load shaft, a yielding driving connection for driving the rotor at a substantially uniform angular velocity when the engine is idling and rotating at a non-uniform angular velocity, and means for establishing a positive drive connection between the engine and the rotor when power flow is established between the engine and the load shaft.

15. In combination, a power shaft rotating at a varying angular velocity, a rotor member having substantial inertia, gearing connecting said rotor member with said power shaft, a positive drive coupling interposed between said shaft and said rotor, said coupling comprising adjacent clutch elements provided with inter-engaging stops permitting limited angular movement between said elements, and resilient means for holding said stops out of contact with each other when the transmission of power ceases.

16. In combination, a power shaft rotating at a varying angular velocity, a rotor member having substantial inertia, gearing connecting said rotor member with said power shaft, a positive drive coupling interposed between said shaft and said rotor, said coupling comprising adjacent clutch elements provided with inter-engaging stops permitting limited angular movement between said elements, resilient means for holding said stops out of contact with each other when the transmission of power ceases, and friction means interposed between said clutch elements for damping oscillations between said elements.

17. In combination, a driven shaft, a rotor element having substantial inertia mounted upon said shaft, a lost-motion positive drive connection between said rotor and said shaft permitting limited relative rotation between said shaft and rotor, and a resilient drive connection between said shaft and said rotor for normally holding said positive drive connection in central position.

18. In combination, a driven shaft, a collar carried by said shaft and having a positive drive connection therewith, a rotor element of substantial inertia journaled at one end upon said collar and a resilient drive connection between said shaft and said rotor for normally holding said stops out of contact with each other comprising resilient rods connected between said spaced collars.

19. In a coupling device, the combination of a rotary element formed of an inner sleeve and a flange supporting an outer sleeve concentric with the inner sleeve, a second rotary element provided with a sleeve journaled upon the inner sleeve of the first rotary element and provided with a flange having tooth projections extending between tooth projections formed in the edge of the outer sleeve of the first rotary element for permitting limited relative rotation between said elements, and resilient means mounted between the sleeve of the second element and the outer sleeve of the first element for normally maintaining the tooth projections of the two elements out of contact with each other.

20. In a coupling device, the combination of a rotary element formed of an inner sleeve and a flange supporting an outer sleeve concentric with the inner sleeve, a second rotary element provided with a sleeve journaled upon the inner sleeve of the first rotary element and provided with a flange having tooth projections extending between tooth projections formed in the edge of the outer sleeve of the first rotary element for permitting limited relative rotation between said elements, resilient means mounted between the sleeve of the second element and the outer sleeve of the first element for normally maintaining the tooth projections of the two elements out of contact with each other, a friction plate engaging the flange on the second rotary element and secured against relative rotation with respect to the first rotary element for damping oscillations between said rotary elements.

ALFONS H. NEULAND.